(12) United States Patent
Sakai et al.

(10) Patent No.: US 10,962,053 B2
(45) Date of Patent: Mar. 30, 2021

(54) AIR BEARING

(71) Applicant: Mitutoyo Corporation, Kanagawa (JP)

(72) Inventors: Hisayoshi Sakai, Kanagawa (JP); Kenji Ueda, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/671,479

(22) Filed: Nov. 1, 2019

(65) Prior Publication Data

US 2020/0149587 A1    May 14, 2020

(30) Foreign Application Priority Data

Nov. 14, 2018 (JP) .............................. JP2018-213799

(51) Int. Cl.
*F16C 32/06* (2006.01)
*G01B 21/04* (2006.01)

(52) U.S. Cl.
CPC ...... *F16C 32/0603* (2013.01); *F16C 32/0614* (2013.01); *F16C 32/0622* (2013.01); *G01B 21/04* (2013.01); *F16C 2370/00* (2013.01)

(58) Field of Classification Search
CPC .......................... F16C 29/025; F16C 32/0603; F16C 32/0614; F16C 32/0622; F16C 32/0625; F16C 32/0672; F16C 2370/00; G01B 21/04; G01B 21/047
USPC ...................................... 384/7, 12, 20, 26, 99
See application file for complete search history.

(56) References Cited

U.S. PATENT DOCUMENTS

| | | | | |
|---|---|---|---|---|
| 2,762,664 A | * | 9/1956 | Manning | F16C 33/6662 384/468 |
| 3,319,660 A | * | 5/1967 | Levine | F16C 32/0622 138/42 |
| 3,635,532 A | * | 1/1972 | Zerbola | F16C 29/025 384/12 |
| 3,640,590 A | * | 2/1972 | Beisemann | F16C 37/002 384/113 |
| 3,781,070 A | * | 12/1973 | Uhtenwoldt | F16C 32/06 384/12 |
| 4,245,844 A | * | 1/1981 | Pohl | F16C 32/06 277/432 |
| 4,465,325 A | * | 8/1984 | Faure | F16C 29/025 376/252 |

(Continued)

FOREIGN PATENT DOCUMENTS

| | | | | |
|---|---|---|---|---|
| CN | 1157377 A | * | 8/1997 | .......... F16C 32/0614 |
| CN | 101219520 A | * | 7/2008 | ............. B23Q 16/02 |

(Continued)

*Primary Examiner* — Marcus Charles
(74) *Attorney, Agent, or Firm* — Rankin, Hill & Clark LLP (57) ABSTRACT

An air bearing includes: a main body part having a bearing surface facing a guide surface; a flow path part provided in the main body part; an air film forming part that supplies compressed air flowing through the flow path part to the guide surface to form an air film; a negative pressure generating part that sucks air between the bearing surface and the guide surface, the negative pressure generating part being provided in the flow path part; a discharge path in communication with the flow path part; and a flow rate adjusting part that adjusts a flow rate of air flowing from the flow path part to the discharge path in accordance with a compressed air pressure corresponding to a load applied to the main body part.

14 Claims, 10 Drawing Sheets

(56) References Cited

U.S. PATENT DOCUMENTS

| | | | | |
|---|---|---|---|---|
| 5,104,237 A * | 4/1992 | Slocum | F16C 29/025 | 29/898.02 |
| 6,443,618 B1 * | 9/2002 | Nishikawa | F16C 29/025 | 277/351 |
| 6,515,288 B1 * | 2/2003 | Ryding | F16C 29/025 | 250/441.11 |
| 7,290,931 B2 * | 11/2007 | Wardman | F16C 29/025 | 384/12 |
| 10,119,565 B2 | 11/2018 | Ueda et al. | | |
| 2002/0097925 A1 * | 7/2002 | Kafai | F16C 29/025 | 384/12 |
| 2002/0118897 A1 * | 8/2002 | Sakino | G03F 7/70816 | 384/12 |
| 2004/0057639 A1 * | 3/2004 | Roeders | F16F 15/027 | 384/12 |
| 2004/0246455 A1 * | 12/2004 | Emoto | F16C 33/748 | 355/53 |
| 2005/0180666 A1 * | 8/2005 | Ahn | F16C 29/025 | 384/12 |
| 2005/0254036 A1 * | 11/2005 | Sasaki | G03F 7/70766 | 355/72 |
| 2007/0014494 A1 * | 1/2007 | Wardman | F16C 29/025 | 384/12 |
| 2008/0015504 A1 * | 1/2008 | Boehringer | A61M 1/0031 | 604/119 |
| 2008/0304772 A1 * | 12/2008 | Kakutani | F16C 32/0402 | 384/12 |
| 2014/0016886 A1 * | 1/2014 | Li | G03F 7/70783 | 384/12 |
| 2017/0284462 A1 | 10/2017 | Ueda et al. | | |
| 2018/0265969 A1 * | 9/2018 | Spath | H01L 21/67784 | |

FOREIGN PATENT DOCUMENTS

| | | | | |
|---|---|---|---|---|
| CN | 105377464 A | * | 3/2016 | B21D 28/22 |
| CN | 107269698 A | * | 10/2017 | G01B 5/0009 |
| CN | 107322013 A | * | 11/2017 | F16C 29/025 |
| JP | 2017-187060 | | 10/2017 | |
| WO | WO-2009153980 A1 | * | 12/2009 | B03C 1/03 |
| WO | WO-2013180424 A1 | * | 12/2013 | F23R 3/14 |
| WO | WO-2016136495 A1 | * | 9/2016 | F16C 32/0622 |

* cited by examiner

AIR BEARING

CROSS-REFERENCE TO RELATED APPLICATIONS

The present application claims priority to the Japanese Patent Application number 2018-213799, filed on Nov. 14, 2018. The contents of this application are incorporated herein by reference in their entirety.

BACKGROUND OF THE INVENTION

The present invention relates to an air bearing with a vacuum preloading function.

Conventionally, many air bearings are used for high-precision measuring equipment such as a coordinate measuring machine (CMM) and a guiding mechanism of a high-precision machine tool. When compressed air provided from an exterior compressor to an air bearing is supplied to a guide surface of the guiding mechanism, an air film is generated between a bearing surface and the guide surface of the air bearing. Accordingly, the bearing surface floats from the guide surface, and so a guiding mechanism with substantially zero sliding resistance can be realized.

It is known that the air film has a characteristic that its stiffness varies non-linearly in accordance with a load applied on the air bearing, and the stiffness of the air film is low and unstable in a light-load state. Accordingly, in order to secure the stiffness of the air film, an air bearing of a vacuum preloading method in which air is sucked from between the bearing surface and the guide surface to provide a preload (see Japanese Unexamined Patent Application Publication No. 2017-187060) has been proposed.

However, when the above-mentioned air bearing of the vacuum preloading system is adopted, a region in which an air film for supporting a load can be formed is narrowed since a part between the bearing surface and the guide surface is used as a region for sucking air. As a result, it may be difficult to adequately support higher loads applied to the air bearing.

BRIEF SUMMARY OF THE INVENTION

This invention focuses on these points, and an object of the invention is to appropriately support an air bearing with an air film even when a wide range of loads are applied to the air bearing.

According to one aspect of the present invention, there is provided an air bearing including: a main body part that has a bearing surface facing a guide surface; flow path part provided in the main body part through which compressed air flows, an air film forming part that supplies the compressed air flowing through the flow path part to the guide surface to form an air film between the bearing surface and the guide surface; a negative pressure generating part that sucks air between the bearing surface and the guide surface by generating a negative pressure by increasing flow velocity of the passing compressed air, the negative pressure generating part being provided in the flow path part; a discharge path that discharges the compressed air which passed through the negative pressure generating part and the air sucked by the negative pressure generating part, the discharge path being in communication with the flow path part; and a flow rate adjusting part that adjusts a flow rate of air flowing from the flow path part to the discharge path in accordance with a compressed air pressure corresponding to a load applied to the main body part.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Figure 1:
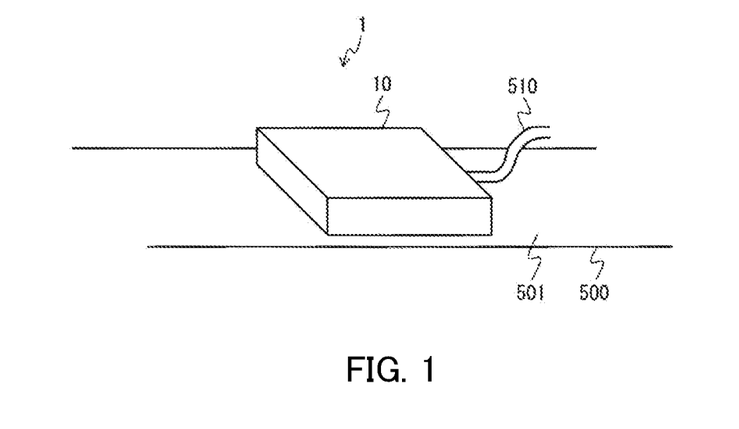
FIG. 1 shows a schematic diagram illustrating an external configuration of an air bearing 1 according to a first embodiment of the present invention.
Figure 2:
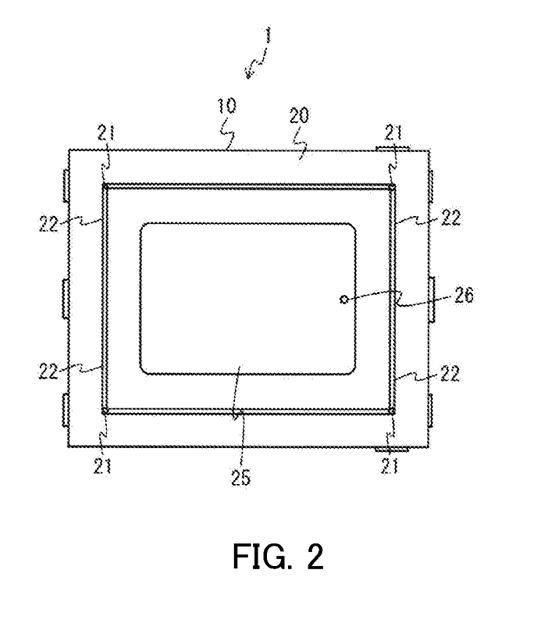
FIG. 2 shows a bearing surface 20 of the air bearing 1.

First Embodiment (Outline of the Air Bearing)
Referring to FIGS. 1 and 2, an external configuration of an air bearing according to a first embodiment of the present invention will be explained. FIG. 1 shows a schematic diagram illustrating the external configuration of the air bearing 1 according to the first embodiment. FIG. 2 shows a bearing surface 20 side of the air bearing 1.

The air bearing 1 is used for a high-precision measuring instrument such as a coordinate measuring machine (CMM). The air bearing 1 is provided at a lower portion of a moving mechanism (column) for moving a probe in the CMM, for example. The air bearing 1 faces a guide rail 500 of the guiding mechanism, as shown in FIG. 1, and guides the column along the guide rail 500. The air bearing 1 is a non-contact type bearing in which an air film is interposed between a guide surface 501 of the guide rail 500 and the bearing surface 20 (FIG. 2).

The air bearing 1 includes a main body part 10 having a rectangular parallelepiped shape. The main body part 10 is made of, for example, metal and is connected to a compressor that supplies compressed air with a sufficient flow rate via a supply path 510. Inside the main body part 10, flow paths (described later) through which the supplied compressed air flows are provided. Further, as shown in FIG. 2, the bearing surface 20, an air supply hole 21, an air supply groove 22, a recessed part 25, and a suction hole 26 are provided on the bottom surface of the main body part 10.

The bearing surface 20 faces the guide surface 501 (FIG. 1) of the guide rail 500. When the compressed air is supplied to the air bearing 1, an air film formed of compressed air is interposed between the bearing surface 20 and the guide surface 501.

The air supply hole 21 is a through-hole providing communication between the bearing surface 20 and the flow paths in the main body pail 10, and supplies the compressed air toward the guide surface 501. As a result, the air film of compressed air is formed between the bearing surface 20 and the guide surface 501 (air supply region), in the present embodiment, the air supply hole 21 corresponds to an air film forming part. The bearing surface 20 of the main body part 10 has four air supply holes 21.

The air supply groove 22 is an annularly recessed groove in the bearing surface 20. The air supply groove 22 communicates with four air supply holes 21. The compressed air supplied by the air supply holes 21 flows along the air supply groove 22, and so the air film is formed between the bearing surface 20 and the guide surface 501 (air supply region). That is, the air supply region is the air supply groove and a region around the air supply groove 22. By providing the air supply groove 22, it is easier to form an air film having a uniform thickness over a wider area.

The recessed part 25 is a recess in which the bearing surface 20 is recessed. The recessed part 25 is formed in a rectangular shape closer to the center than the air supply groove 22 in the bearing surface 20.

The suction hole 26 is a through-hole providing communication between the recessed part 25 and the flow paths in the main body part 10, and sucks the air between the bearing surface 20 and the guide surface 501 (suction region). Specifically, the suction hole 26 is provided in the recessed part 25, and sucks the air in the recessed part 25. That is, the recessed part 25 is a suction region. The suction hole 26, whose details will be described later, sucks the air in the recessed part 25 using a negative pressure generated by a negative pressure generating part provided in the main body part 10. As a result, suction force can be venerated in the recessed part 25.

Since the moving mechanism (such as a column) is provided on the air bearing 1, a load acts on the air bearing 1. Since the moving mechanism of the CMM moves in three perpendicular directions, the load applied on the air bearing 1 may fluctuate during the moving. Hereinafter, a relationship between (i) the stiffness of the air film and (ii) the load between the bearing surface 20 and the guide surface 501 will be explained. The stiffness of the air film is defined by using the load and the thickness of the air film (hereinafter also referred to as a film thickness) as shown in the following Equation (1).

$$k = \frac{\Delta W}{\Delta h} \quad (1)$$

In Equation (1), the stiffness of the air film is indicated by k, variation in the load applied on the air bearing 1 is indicated by $\Delta W$, and variation in the thickness of the air film is indicated by $\Delta h$.

Further, because $\Delta W = \Delta p \times A$ when assuming that the change in the air pressure after passing through an air supply hole 21 is $\Delta p$ and a bearing effective area (the bearing effective area is substantially constant) is A, the above Equation (1) can be replaced by the following Equation (2).

$$k = A \times \frac{\Delta p}{\Delta h} \quad (2)$$

Figure 3:
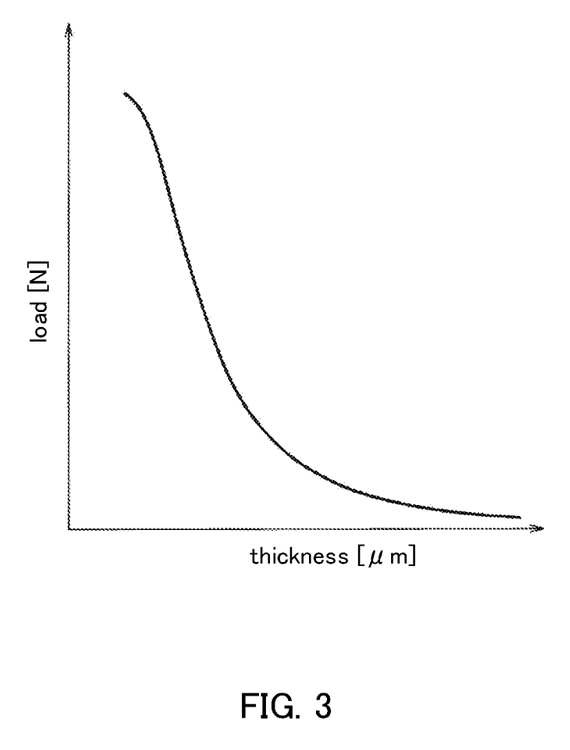
FIG. 3 shows a relationship between a thickness of an air film and a load.

FIG. 3 shows a relationship between the thickness of the air film and the load. In FIG. 3, the horizontal axis of the graph indicates the thickness [μm] of the air film, and the vertical axis indicates the load [N]. The stiffness k defined by Equation (1) corresponds to the slope of a characteristic curve shown in FIG. 3. As can be seen from FIG. 3, in the range where the thickness of the air film is small (hereinafter, also referred to as the first range), the slope is steep at the approximately linear part in this characteristic curve, and the stiffness of the air film is high. Therefore, even if the load fluctuates in the first range, the fluctuation of the thickness of the air film is small, and the air film is maintained in a stable state. On the other hand, in a range in which the thickness of the air film is large (hereinafter, also referred to as the second range), the slope of the curve is gentle, and the stiffness of the air film is low. For this reason, when the load fluctuates in the second range, the thickness of the air film also fluctuates, and the air film becomes unstable.

In order to enhance the stiffness of the air film between the bearing surface 20 and the guide surface 501 and to maintain the stable state, it is desirable to use the air film within the range of the load corresponding to the approximately linear part in the characteristic curve of FIG. 3. Therefore, when the load applied on the air bearing 1 is small, the air is sucked from the suction hole 26 to generate a load (give a preloading) for attracting the air bearing 1 and the guide surface 501. This makes it possible to use the air film in the region of the approximately linear part in the characteristic curve even if the load applied on the air bearing 1 is small, and it is possible to enhance the stiffness of the air film.

On the other hand, in the case where the bearing surface 20 has the suction hole 26, a part between the bearing surface 20 and the guide surface 501 is used as the suction region, so that the air supply region between the bearing surface 20 and the guide surface 501 is narrower compared to the case where the bearing surface 20 has no suction hole 26, and the maximum load supported by the air film is reduced. On the other hand, in the present embodiment, as will be described in detail later, by providing a flow rate adjusting part for adjusting the suction of air by the suction hole 26 in accordance with the load applied on the air bearing 1, it is possible to prevent a reduction in the maximum load supported by the air film.

<Internal Configuration of the Air Bearing>

Figure 4:
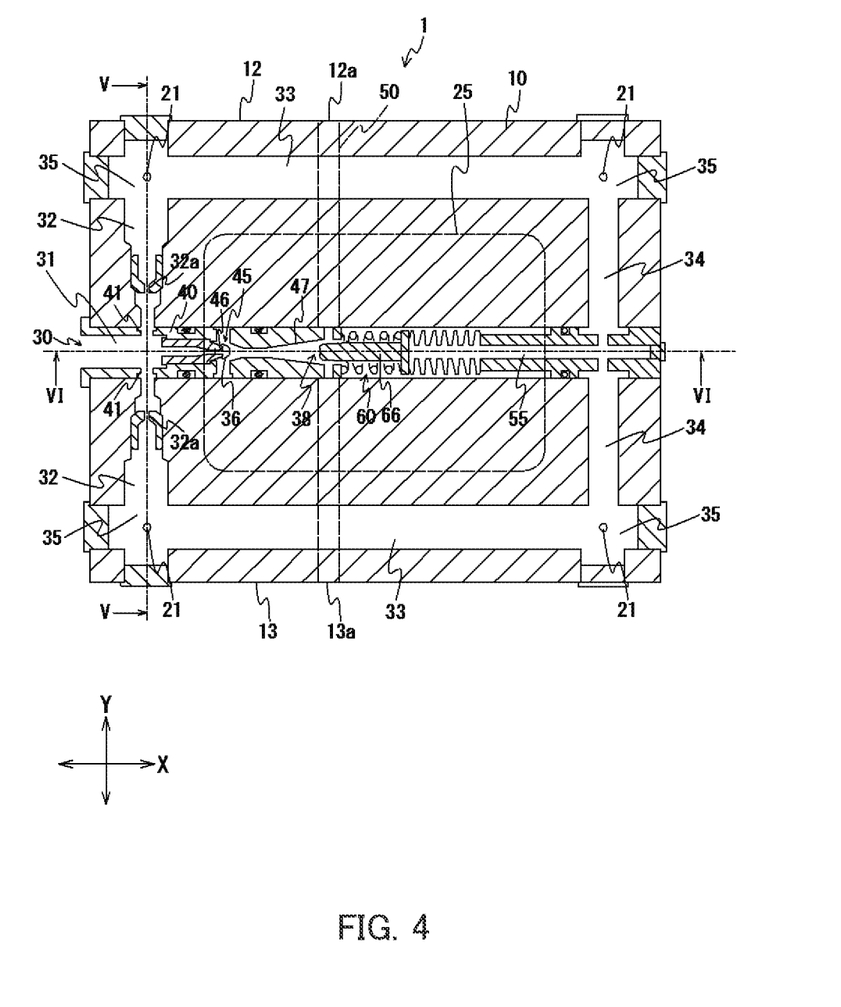
FIG. 4 shows an internal configuration of the air bearing 1.
Figure 5:
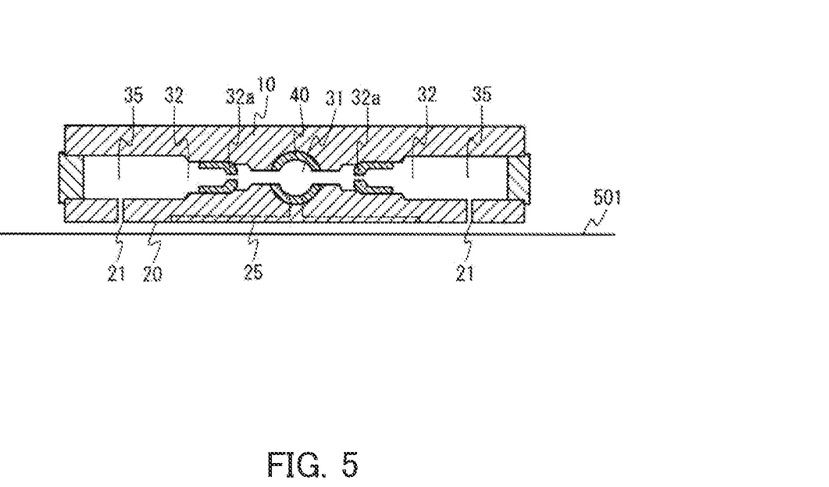
FIG. 5 shows a V-V cross-sectional view of FIG. 4.
Figure 6:
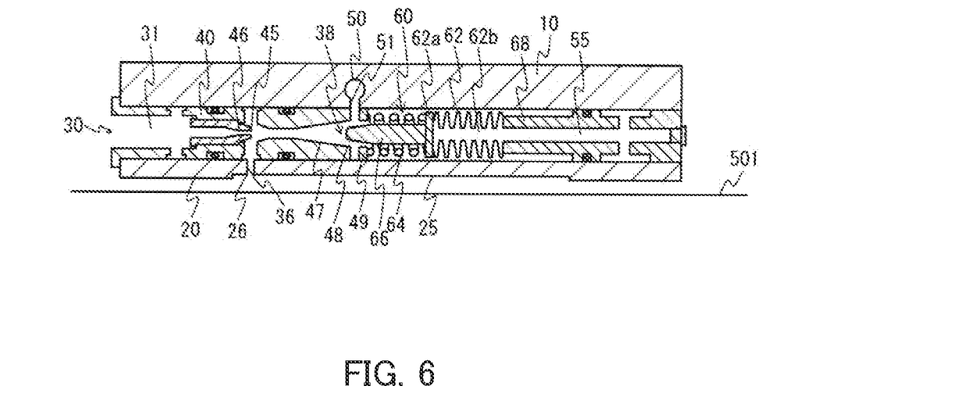
FIG. 6 shows a VI-VI cross-sectional view of FIG. 4.
Figure 7:
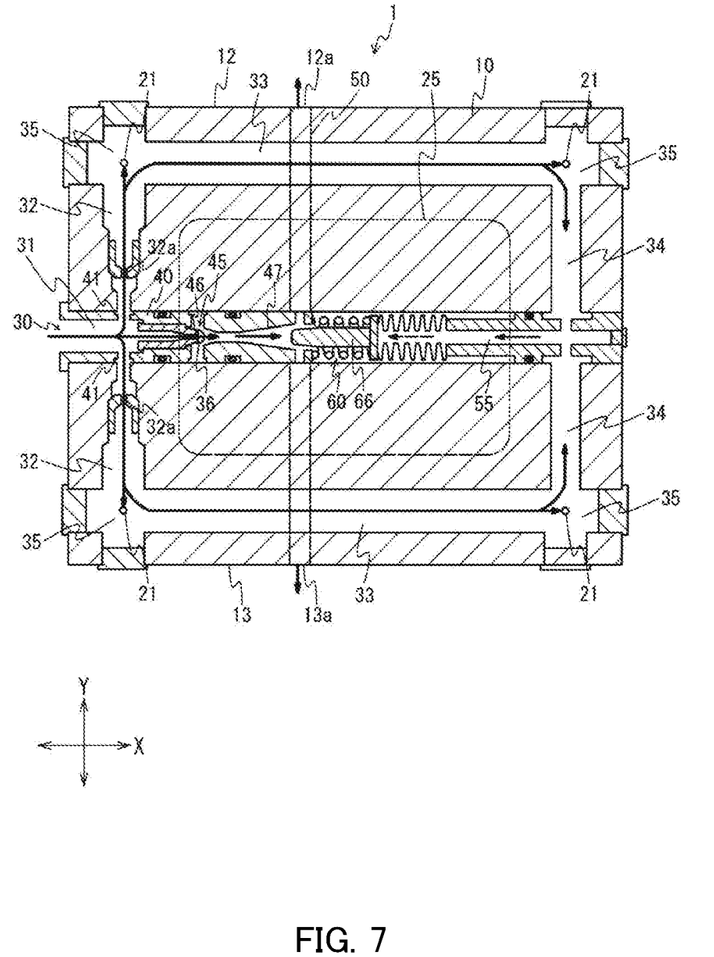
FIG. 7 shows a diagram illustrating a flow of air in the air bearing 1.
Figure 8:
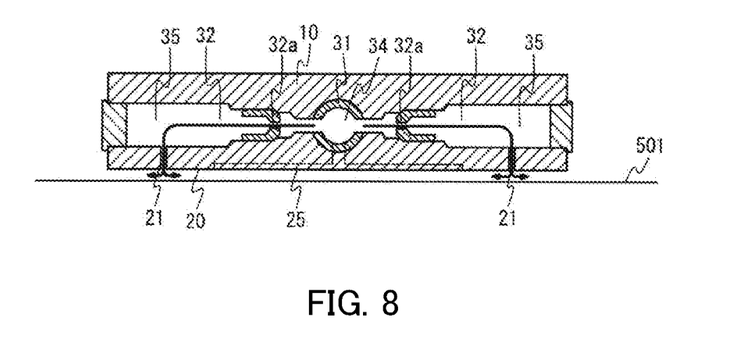
FIG. 8 shows a diagram illustrating the flow of air in the air bearing 1.
Figure 9:
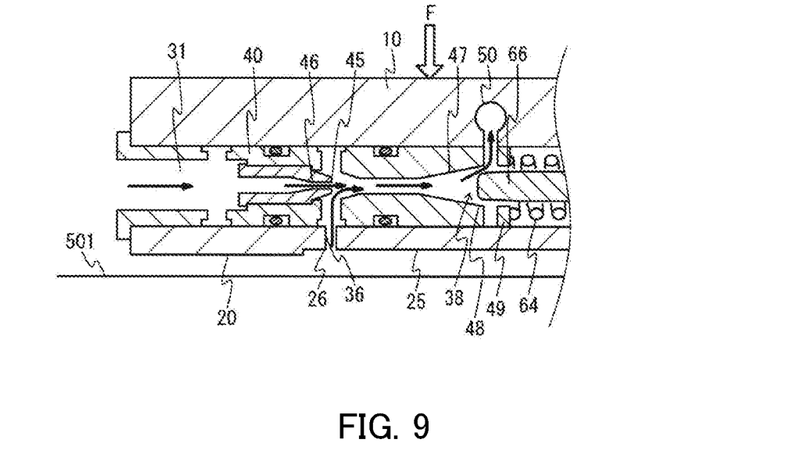
FIG. 9 shows a diagram illustrating the flow of air in the air bearing 1.

An internal configuration of the air bearing 1 is explained with reference to FIGS. 4 to 9. FIG. 4 shows the internal configuration of the air bearing 1. FIG. 5 shows a V-V a cross-sectional view of FIG. 4. FIG. 6 shows a VI-VI cross-sectional view of FIG. 4. FIGS. 7 to 9 each illustrate a flow of air in the air bearing 1. In FIGS. 7 to 9, the flow of air is indicated by a bold line.

As shown in FIG. 4, the air bearing 1 includes an inlet port 30, flow paths 31, 32, 33, and 34, a suction path 36, a vacuum ejector 40, a negative pressure generating part 45, a discharge path 50, a propagation path 55, and a flow rate adjusting part 60.

The flow paths 31, 32, 33, and 34 are provided in the main body part 10 as shown in FIG. 4, and are each a flow path part through which compressed air from the inlet port 30 flows. The flow paths 31 and 33 are provided along the X-axis direction in FIG. 4, and the flow paths 32 and 34 are provided along the Y-axis direction in FIG. 4 so as to be orthogonal to the flow paths 31 and 33. The flow path 32 is a flow path branched from the flow path 31. The flow path 33 is a flow path communicating with the flow paths 32 and 34. The compressed air that is diverted from the flow path 31 to the flow path 32 flows in the order of the flow path 32, the flow path 33, and the flow path 34, as shown in FIG. 7.

An air chamber 35 at a position where the flow paths 32, 33, and 34 intersect with each other has the above-described air supply holes 21. Therefore, a portion of the compressed air flowing through the flow paths 32, 33, and 34 is supplied from the air supply holes 21 as shown in FIG. 8, and forms an air film between the bearing surface 20 and the guide surface 501 (air supply region). A restrictor 32a for restricting the flow path of the flow path 32 is provided in the middle of the flow path 32. The flow path 31 has the above-described suction hole 26 in the middle of the flow path 31.

As shown in FIG. 6, the suction path 36 creates communication between the flow path 31 and the bearing surface 20, and is a flow path through which the air sucked from the suction hole 26 flows. One end side of the suction path 36 is connected to the suction hole 26, and the other end side of the suction path 36 is connected to the negative pressure generating part 45 in the vacuum ejector 40 provided in the flow path 31. Air sucked from between the bearing surface 20 and the guide surface 501 (suction region) via the suction hole 26 flows through the suction path 36 to the flow path 31 (specifically, the vacuum ejector 40), as shown in FIG. 9.

The vacuum ejector 40 is provided in the flow path 31 as shown in FIG. 6, and has a function of generating a negative pressure by using compressed air. The vacuum ejector 40 is a metal or resin mounting member that is detachably mounted in the flow path 31 from the inlet port 30. For example, the vacuum ejector 40 has a screw part that can be fastened to the flow path 31. The vacuum ejector 40 has a cylindrical shape, and compressed air passes through it. The vacuum ejector 40 has an opening 41 (FIG. 4) on the outer peripheral surface, and a portion of the compressed air flowing through the flow path 31 flows through the opening 41 to the flow path 32. As shown in FIG. 4, the vacuum ejector 40 includes the negative pressure generating part 45 and a diffuser part 47.

The negative pressure generating part 45 increases flow velocity of the compressed air passing through the inside of the vacuum ejector 40 to generate a negative pressure for sucking the air in the recessed part 25. By generating such a negative pressure, a preload can be applied, and the stiffness of the air film can be enhanced.

As shown in FIG. 6, the negative pressure generating part 45 has a nozzle part 46 on the tip side. The nozzle part 46 is a restrictor that restricts the flow path of the compressed air, and increases the flow velocity of the compressed air. The nozzle part 46 is formed in a conical shape and increases the flow velocity of the compressed air at a tip of the nozzle. In particular, the flow velocity of the compressed air increases in accordance with the diameter of the opening at a tip of the nozzle part 46. When the flow velocity of the compressed air at the nozzle tip increases, the pressure around the nozzle tip decreases, thereby generating a negative pressure.

The tip of the nozzle part 46 is located right above the suction path 36 (suction hole 26). Therefore, a negative pressure is generated around the suction hole 26. The negative pressure is generated in a direction orthogonal to the flow of compressed air in accordance with the Bernoulli's principle of negative pressure generation. Here, the negative pressure is generated in the direction from the suction hole 26 to the tip of the nozzle part 46 located above. By generating such a negative pressure, the air in the recessed part 25 passes through the suction hole 26 and suction path 36, and flows into the negative pressure generating part 45 as shown in FIG. 9. It should be noted that the air flowing into the negative pressure generating part 45 flows to the diffuser part 47 together with the compressed air.

As shown in FIG. 6, the diffuser part 47 is located on the downstream side of the suction hole 26 in the flow path 31. The diffuser part 47 is a part that decreases the flow velocity of the air flowing in from the suction hole 26 and the compressed air that have passed through the negative pressure generating part 45 to recover the pressure.

As shown in FIG. 6, the discharge path 50 communicates with a communication part 38. Here, the discharge path 50 communicates with the communication part 38 via a connection path 51. The discharge path 50 is a path for discharging the compressed air and suctioned air that have passed through the vacuum ejector 40 (specifically, the diffuser part 47) to the outside of the air bearing 1. The discharge path 50 is provided along a direction (Y-axis direction in FIG. 4) crossing the flow path 31 above the flow path 31 in the vertical direction. In FIG. 4, the discharge path 50 is formed in parallel with the Y-axis direction, but the present invention is not limited to this, and the discharge path 50 may be inclined with respect to the Y-axis direction, for example.

As shown in FIG. 4, the discharge path 50 penetrates between side surfaces 12 and 13 in the Y-axis direction of the main body part 10. Discharge ports 12a and 13a are formed on side surfaces 12 and 13, respectively. Therefore, the compressed air and the suctioned air flowing into the discharge path 50 from the flow path 31 via the communication port 51a flow through the discharge path 50 and are discharged from the discharge ports 12a and 13a (see FIG. 9).

The propagation path 55 communicates with the flow path 34 as shown in FIG. 4, and is a path through which a compressed air pressure of the flow paths 32, 33, and 34 is propagated. As shown in FIG. 4, the propagation path 55 is formed along the X-axis direction so as to intersect with the flow path 34. One end side of the propagation path 55 is connected to the flow path 34, and the other end side of the propagation path 55 is connected to the flow rate adjusting part 60. The propagation path 55 causes the compressed air pressure in the flow paths 32, 32, 34 to propagate to the flow rate adjusting part 60.

The compressed air in the flow paths 32, 33, and 34 forms an air film which supports a load (load F shown in FIG. 9) applied on the main body part 10. The compressed air pressure varies in conjunction with the load applied on the main body part 10. For example, the compressed air pressure is proportional to the pressure of the load applied on the main body part 10. In this manner, the compressed air pressure whose magnitude changes in accordance with the load is propagated to the flow rate adjusting part 60 via the propagation path 55. More specifically, the compressed air pressure is propagated as indicated by the dashed arrows in FIG. 7.

The flow rate adjusting part 60 adjusts a flow rate (hereinafter referred to as a discharge amount of air) of the compressed air and the suctioned air flowing from the flow path 31 to the discharge path 50 in accordance with the compressed air pressure propagated via the propagation path 55. The flow rate adjusting part 60 increases the discharge amount of air when the compressed air pressure is low (in other words, when the load applied on the main body part 10 is small), and facilitates the suction of air from between the bearing surface 20 and the guide surface 501. On the other hand, when the compressed air pressure is high (in other words, when the load applied on the main body part 10 is large), the flow rate adjusting part 60 reduces the discharge amount of air and suppresses the suction of air from between the bearing surface 20 and the guide surface 501. In this manner, the preload is adjusted to enhance the stiffness of the air film between the bearing surface 20 and the guide surface 501 in accordance with the load applied on the main body part 10.

As shown in FIG. 4, the flow rate adjusting part 60 is provided in the communication part 38 of the vacuum ejector 40 to the discharge path 50. The flow rate adjusting part 60 adjusts the discharge amount of air from the flow path 31 to the discharge path 50 by adjusting an opening area of the communication part 38 (specifically, an opening 48 which is a communication port on the tip side of the diffuser part 47). Specifically, the flow rate adjusting part 60 increases the discharge amount of air by increasing the opening area of the opening 48, and reducing the discharge amount of air by reducing the opening 48 opening area.

As shown in FIG. 6, the flow rate adjusting part 60 includes a bellows 62 that is an elastic member, a compression spring 64, and a pillar part 66. In the first embodiment, the bellows 62 and the pillar part 66 correspond to a moving member that moves upon receiving the compressed air pressure.

The bellows 62 functions as a kind of spring having a predetermined spring constant. As shown in FIG. 6, the bellows 62 has a bellows shape. One end side of the bellows 62 is connected to a base 68 in which the propagation path 55 is formed. The other end side of the bellows 62 is joined to the plate 62a. Inside the bellows 62, a cavity 62b is formed through which the compressed air pressure is propagated from the propagation path 55. The bellows 62 expands and contracts in the main body part 10 in the axial direction (X-axis direction in FIG. 4) upon receiving the compressed air pressure propagated from the propagation path 55. The bellows 62 is, for example, a bellows formed by stacking a plurality of annular thin metal plates (specifically, a doughnut plate having a hole at the center) which are welded together alternately at their outer peripheral edges and inner peripheral edges, and an expandable cavity 62b is formed by alternately joining the inner peripheral edges and the outer peripheral edges. It should be noted that having the bellows 62 provided in the main body part 10 as the moving member is effective in terms of eliminating frictional factors such as seals and packing as opposed to the case where a piston is provided in a cylinder, to serve as the moving member.

As shown in FIG. 6, the compression spring 64 is a biasing member provided between the plate 62a of the bellows 62 and a tip part 49 of the vacuum ejector 40. The bellows 62 is biased backward in the axial direction by the biasing force of the compression spring 64. When the compressed air pressure propagated from the propagation path 55 to the cavity 62b of the bellows 62 is greater than the biasing force of the compression spring 64, the bellows 62 extends forward in the axial direction against the biasing force (in this case, the compression spring 64 contracts). On the other hand, when the compressed air pressure in the cavity 62b decreases, the bellows 62 contracts backward due to the biasing force of the compression spring 64 (in this case, the compression spring 64 extends).

The pillar part 66 is provided on the tip side of the bellows 62, and has, for example, a conical shape. The pillar part 66 is connected to the plate 62a of the bellows 62. The pillar part 66 is provided so as to protrude from the plate 62a in the axial direction. The pillar part 66 moves in the axial direction in conjunction with expansion and contraction of the bellows 62. For example, when the bellows 62 extends, the tip side of the pillar part 66 enters the diffuser part 47 from the opening 48. The pillar part 66 moves relative to the opening 48 as the bellows 62 expands and contracts (i.e., the pillar part 66 moves away from the opening 48 as the bellows 62 contracts, and approaches the opening 48 as the bellows 62 expands) to adjust a gap with the opening 48. As a result, the discharge amount of air flowing through the opening 48 to the discharge path 50 can be adjusted.

The flow rate adjusting part 60 stops the suction of air by the negative pressure generating part 45 by closing the communication part 38 (opening 48). That is, when the tip side of the pillar part 66 closes the opening 48, no air flows toward the discharge path 50, and no air is sucked by the negative pressure generating part 45. Instead, compressed air that has passed through the nozzle part 46 of the negative pressure generating part 45 flows through the suction path 36 to the suction hole 26.

Figure 10:
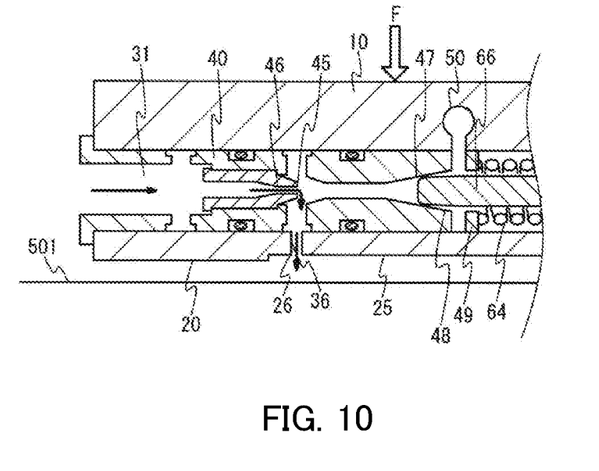
FIG. 10 is a schematic diagram illustrating the flow of compressed air when a pillar part 66 closes an opening 48.

FIG. 10 is a schematic diagram illustrating the flow of compressed air when the pillar part 66 closes an opening 48. When the pillar part 66 closes the opening 48, the compressed air that has passed through the nozzle part 46 is directed through the suction path 36 to the suction hole 26, rather than to the discharge path 50, as shown in FIG. 10. That is, the compressed air that has passed through the nozzle part 46 flows through the suction path 36, instead of the air sucked from the suction path 36 flowing through the suction path 36. The compressed air flowing through the suction path 36 is supplied from the suction hole 26, and an air film is also formed in the recessed part 25 of the bearing surface 20.

When the pillar part 66 closes the opening 48, compressed air is supplied from the air supply holes 21 and the suction hole 26, so that the air film can be formed in a wide region (i.e., the air supply region and the air suction region before the opening 48 is closed) between the bearing surface 20 and the guide surface 501. Therefore, the region of the air film when the opening 48 is closed is wider than the region of the air film when the opening 48 is open. Because the air film can be maximally formed between the bearing surface 20 and the guide surface 501 in this manner, a load applied on the main body part 10 can be supported even when the load increases.

When the compressed air having passed through the nozzle part 46 is supplied from the suction hole 26, an air film can be formed in the same manner as when the compressed air having passed through the restrictor 32a provided in the flow path 32 is supplied from the air supply holes 21 even if the restrictor is not provided in the suction path 36. Meanwhile, by not providing a restrictor in the suction path 36, it is possible to appropriately suck air from between the bearing surface 20 and the guide surface 501 without experiencing flow path resistance.

<Flow of the Compressed Air and the Suctioned Air>

The flow of compressed air and suctioned air in the air bearing 1 will be explained with reference to FIGS. 7 to 10.

First, the compressed air supplied via the supply path 510 (FIG. 1) flows into the flow path 31 from the inlet port 30. The compressed air flows through the flow path 31, and is divided into three directions as shown in FIG. 7. That is, a portion of the compressed air flows from the flow path 31 to the flow path 32, and the rest of the compressed air travels straight through the flow path 31 to the negative pressure generating part 45.

The compressed air diverted to the flow path 32 flows through the flow path 32, passes through the restrictor 32a, and then flows to the flow paths 33 and 34. At this time, compressed air is supplied from the air supply holes 21 as shown in FIG. 8. Therefore, an air film is formed by the compressed air supplied between the bearing surface 20 and the guide surface 501 (air supply region).

The compressed air that travels straight through the flow path 31 passes through the nozzle part 46 of the negative pressure generating part 45. The flow velocity of the compressed air is increased by the nozzle part 46 and, a negative pressure is generated in the direction perpendicular to the flow. This negative pressure causes air between the bearing surface 20 and the guide surface 501 to be drawn from the suction hole 26 and flow through the suction path 36 to the negative pressure generating part 45, as shown in FIG. 9. Then, the compressed air and the suctioned air flow to the discharge path 50 and are discharged from the discharge ports 12a and 13a (shown in FIG. 7).

On the other hand, although the compressed air pressure flowing through the flow paths 32, 33, and 34 fluctuates according to the load (load F in FIGS. 9 and 10) applied on the main body part 10, the compressed air pressure flowing through the flow paths 32, 33, and 34 is propagated to the cavity 62b inside the bellows 62 of the flow rate adjusting part 60 via the propagation path 55 (see FIG. 7). The flow rate adjusting part 60 adjusts the opening area of the opening 48 in accordance with the propagated compressed air pressure to adjust the discharge amount of air. At this time, the flow rate adjusting part 60 automatically adjusts the opening area of the opening 48 by moving the bellows 62 back and forth and displacing the pillar part 66 upon receiving the compressed air pressure.

Variation Example 1

In the embodiment described above, the recessed part 25 recessed at the center of the bearing surface 20 has the suction hole 26 shown in FIG. 2, but the present invention is not limited thereto. For example, the suction hole 26 may be provided in an annular groove formed in a ring shape as in Variation example 1, shown in FIG. 11.

Figure 11:
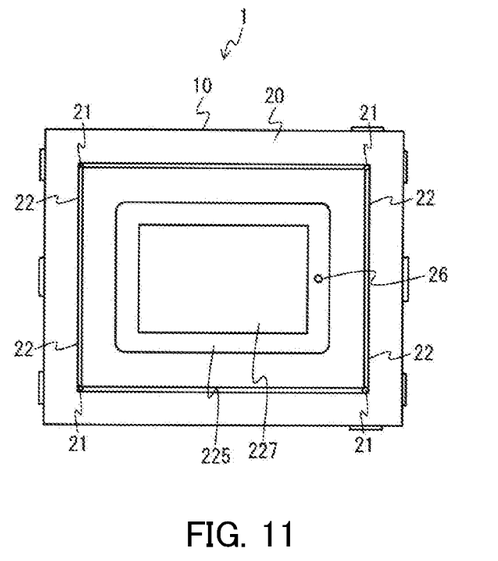
FIG. 11 is a schematic diagram illustrating Variation example 1.

FIG. 11 is a schematic diagram illustrating Variation example 1. In Variation example 1, as shown in FIG. 11, an annular groove 225 which is a groove formed in a ring shape has a suction hole 26. Inside the annular groove 225, there is a surface 227 having a rectangular shape. In other words, the annular groove 225 is a groove along the edge of the surface 227. The surface 227 is flush with the bearing surface 20. As a result, since the surface 227 does not need to be recessed, the amount of processing is smaller than that of the configuration (rectangular recessed part 25) shown in FIG. 2, and consequently it is easier to manufacture the air bearing 1.

In the configuration of Variation example 1, the suction hole 26 sucks not only the air in the annular groove 225 but also the air in a region facing the surface 227. That is, the annular groove 225 and the surface 227 become the suction region for generating suction force. On the other hand, when compressed air flows to the suction hole 26 and is supplied by closing the opening 48, as described above with reference to FIG. 10, an air film having the same thickness as that of the bearing surface 20 is also formed on the surface 227. As a result, a larger load acting on the air bearing 1 can be supported with the air film formed on the surface 227 and the bearing surface 20.

Variation Example 2

In the embodiment described above, the air supply groove 22 connected in a ring shape so as to surround the recessed part 25 has a plurality (four) of air supply holes 21, as shown in FIG. 2, but the present invention is not limited thereto. For example, four air supply holes 21 may be provided in separate air supply grooves as in Variation example 2, shown in FIG. 12.

Figure 12:
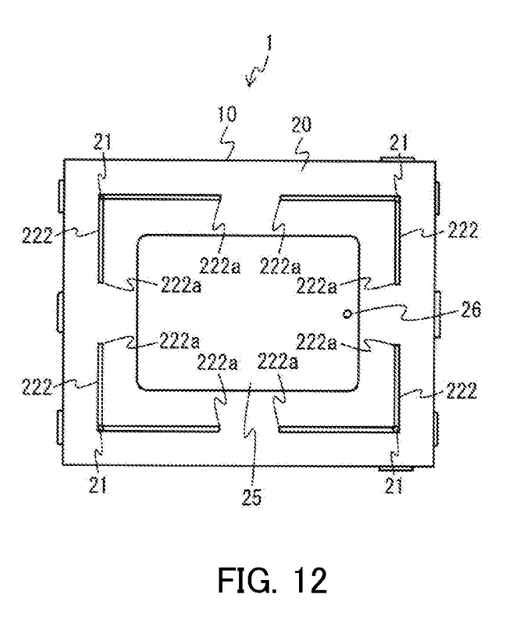
FIG. 12 is a schematic diagram illustrating Variation example 2.

FIG. 12 is a schematic diagram illustrating Variation example 2. In Variation example 2, as shown in FIG. 12, four air supply grooves 222 are each formed in an L shape and each have one air supply hole 21. End portions 222a of four air supply grooves 222 are not connected to each other, and are separated by a predetermined interval. The part between the end portions 222a is flush with the bearing surface 20. As a result, the amount of processing is smaller than that of the configuration of air supply groove 222 shown in FIG. 2, and consequently it is easier to manufacture the air bearing 1.

In the configuration of Variation example 2, similarly to the configuration of FIG. 2, compressed air is supplied from the air supply holes 21 to form an air film. As described above, the area of the bearing surface 20 increases because the end portions 222a are separated from each other, so that a large load acting on the air bearing 1 can be supported. It should be noted that, in Variation example 2, the annular groove 225 (FIG. 11) described in Variation example 1 may be provided instead of the recessed part 25.

<Effects of the First Embodiment>

The air bearing 1 of the first embodiment described above includes: the discharge path 50 for discharging the compressed air and the suctioned air (referred to as the discharge amount of air) having passed through the negative pressure generating part 45; and the flow rate adjusting part 60 for adjusting the discharge amount of air from the discharge path 50 in accordance with the load applied to the main body part 10. When the load applied on the main body part 10 is small, the flow rate adjusting part 60 (i) increases the discharge amount of air, (ii) promotes the suction of the air from between the bearing surface 20 and the guide surface 501, and (iii) increases the preload. On the other hand, when the load applied on the main body part 10 is large, the flow rate adjusting part 60 reduces the discharge amount of air to suppress the suction of the air from between the bearing surface 20 and the guide surface 501, thereby reducing the preload. As a result, the preload corresponding to the load applied on the main body part 10 can be automatically adjusted (i.e., the stiffness of the air film can be adjusted), so that an air film capable of coping with a wide range of loads can be easily formed.

In the first embodiment, the flow rate adjusting part 60 closes the opening 48 as shown in FIG. 10, so that the compressed air that has passed through the negative pressure generating part 45 flows to the suction hole 26 and is supplied from the suction hole 26 without going to the discharge path 50. As a result, compressed air is supplied from the air supply holes 21 and the suction hole 26 to form an air film in a large region between the bearing surface 20 and the guide surface 501, so that the air film can support a large load applied on the main body part 10.

Second Embodiment

The configuration of the air bearing 1 according to the second embodiment will be described referring to FIGS. 13 and 14.

Figure 13:
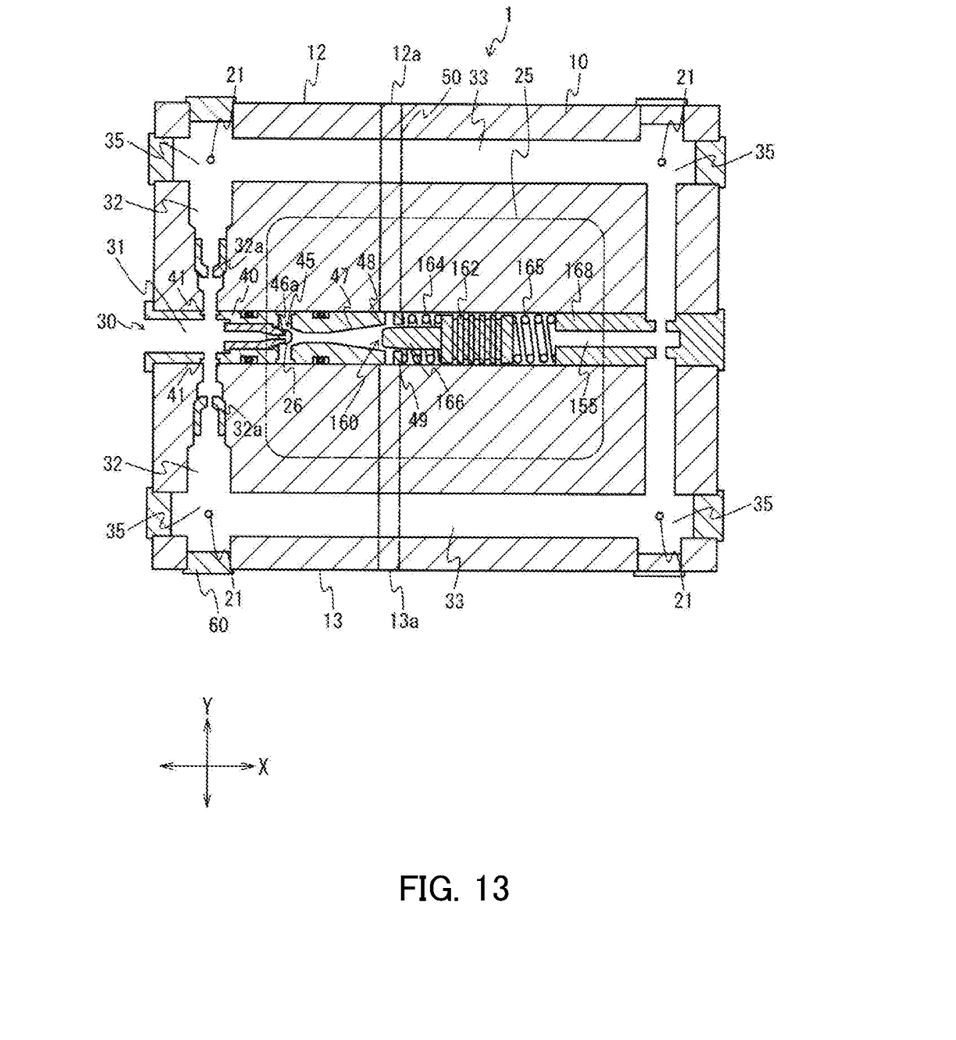
FIG. 13 is a schematic diagram illustrating a configuration of the air bearing 1 according to the second embodiment.
Figure 14:
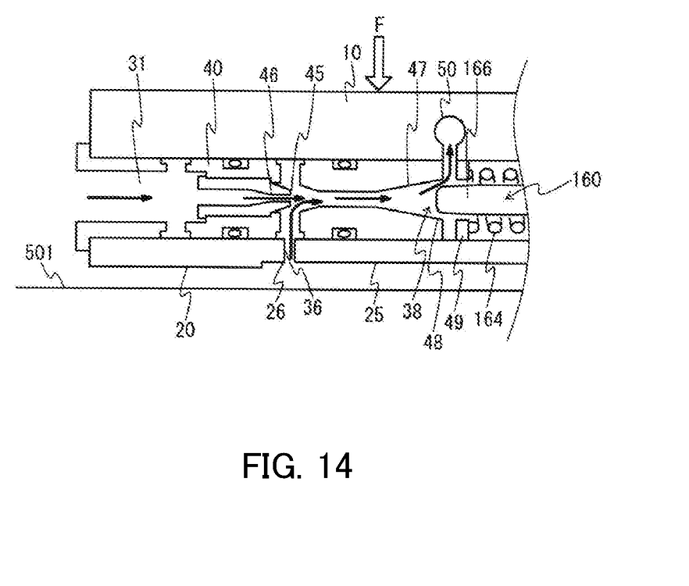
FIG. 14 is a schematic diagram illustrating the configuration of the air bearing 1 according to the second embodiment.

FIGS. 13 and 14 are each a schematic diagram illustrating a configuration of the air bearing 1 according to the second embodiment. The configuration of the flow rate adjusting part 160 of the second embodiment differs from the configuration of the flow rate adjusting part 60 of the first embodiment. Configurations other than the flow rate adjusting part 160 of the second embodiment are the same as those of the first embodiment, and therefore detailed descriptions thereof are omitted.

In a similar manner as the first embodiment, the flow rate adjusting part 160 adjusts a flow rate (discharge amount of air) of the compressed air and the suctioned air flowing from the flow path 31 to the discharge path 50 in accordance with the compressed air pressure propagated via the propagation path 155. This enhances the stiffness of the air film between the bearing surface 20 and the guide surface 501 by adjusting the preload in accordance with the load (load F in FIG. 14) applied on the main body part 10.

As shown in FIG. 13, the flow rate adjusting part 160 includes a shaft part 162, compression springs 164 and 165, and a pillar part 166. In the second embodiment, the shaft part 162 and the pillar part 166 correspond to a moving member that moves upon receiving the compressed air pressure.

The shaft part 162 is a shaft member that can move in the axial direction (X-axis direction in FIG. 13) within the main body part 10. The shaft part 162 moves back and forth in the axial direction upon receiving the compressed air pressure propagated to the propagation path 155. That is, the shaft part 162 moves back and forth in the axial direction in response to a pressure change of the compressed air corresponding to a pressure change of the load applied to the main body part 10. A so-called labyrinth seal is provided on the outer peripheral surface of the shaft part 162, and the labyrinth seal is formed between the outer peripheral surface of the shaft part 162 and the inner wall surface of the main body part 10.

The compression springs 164 and 165 are respectively provided on the sides of the shaft part 162 in the axial direction, and bias the shaft part 162. The compression spring 164 is provided between the shaft part 162 and the tip part 49 of the vacuum ejector 40. The compression spring 165 is provided between the shaft part 162 and the base 168. It should be noted that the biasing force of the compression spring 164 is larger than the biasing force of the compression spring 165.

The compressed air that has been propagated through the propagation path 155 is propagated from the periphery of the compression spring 165 to the shaft part 162. When the compressed air pressure is high, the shaft part 162 advances forward in the axial direction against the biasing force of the compression spring 164 (at this time, the compression spring 164 contracts and the compression spring 165 expands). On the other hand, when the compressed air pressure is reduced, the shaft part 162 is retracted by the biasing force of the compression spring 164 (in this case, the compression spring 165 is extended and the compression spring 165 is contracted).

The pillar part 166 is a tip part provided on the tip side of the shaft part 162, and has, for example, a conical shape. The pillar part 166 is connected to an axial end portion of the shaft part 162. The pillar part 166 moves in the axial direction in conjunction with movement of the shaft part 162. For example, when the shaft part 162 advances forward, the tip side of the pillar part 166 enters the diffuser part 47 from the opening 48. The pillar part 166 adjusts a gap with the opening 48 by moving toward the opening 48 in conjunction with the movement of the shaft part 162. As a result, the discharge amount of air flowing through the opening 48 to the discharge path 50 can be adjusted.

When the pillar part 166 closes the opening 48, the suction of air the negative pressure generating part 45 stops in the second embodiment as well. That is, when the pillar part 166 closes the opening 48, the flow of air toward the discharge path 50 does not occur, and the air is not sucked by the negative pressure generating part 45. Instead, the compressed air flowing to the negative pressure generating part 45 flows through the suction path 36 and is supplied from the suction hole 26 to form an air film (see FIG. 10).

In the second embodiment described above, the flow rate adjusting part 160 adjusts the discharge amount of air from the air discharge path 50 in accordance with the load applied to the main body part 10. The flow rate adjusting part 160 adjusts the discharge amount of air, and therefore the preload corresponding to the load applied on the main body part 10 can be automatically adjusted, so that an air film capable of coping with a wide range of loads can be easily formed, in a similar manner as the first embodiment.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. An air bearing comprising:
    a main body part that has a bearing surface facing a guide surface;
    a flow path part provided in the main body part through which compressed air flows;
    an air film forming part that supplies the compressed air flowing through the flow path part to the guide surface to form an air film between the bearing surface and the guide surface;
    a negative pressure generating part that sucks air between the bearing surface and the guide surface by generating a negative pressure by increasing flow velocity of the passing compressed air, the negative pressure generating part being provided in the flow path part;
    a discharge path that discharges the compressed air which passed through the negative pressure generating part and the air sucked by the negative pressure generating part, the discharge path being in communication with the flow path part; and
    a flow rate adjusting part that adjusts a flow rate of air flowing from the flow path part to the discharge path by moving upon receiving a compressed air pressure corresponding to a load applied to the main body part.

2. The air bearing according to claim 1 further comprising
a propagation path that propagates the compressed air pressure corresponding to the load applied to the main body part to the flow rate adjusting part, wherein
the flow rate adjusting part adjusts the flow rate of the air flowing from the flow path part to the discharge path upon receiving the compressed air pressure propagated via the propagation path.

3. The air bearing according to claim 2, wherein
the propagation path is a path connecting the flow path part and the flow rate adjusting part in the main body part.

4. The air bearing according to claim 2, wherein
the flow rate adjusting part facilitates suction of air from between the bearing surface and the guide surface by increasing the flow rate of air flowing from the flow path part to the discharge path when the compressed air pressure propagated via the propagation path is low, and suppresses the suction of air from between the bearing surface and the guide surface by reducing the flow rate of the air flowing from the flow path part to the discharge path when the compressed air pressure propagated via the propagation path is high.

5. The air bearing according to claim 1, wherein
a communication part for creating communication between the flow path part and the discharge path has a communication port, and
the flow rate adjusting part stops the suction of air by the negative pressure generating part by closing the communication port.

6. The air bearing according to claim 5, further comprising
a suction path through which the air sucked from between the bearing surface and the guide surface flows to the negative pressure generating part, wherein
the flow rate adjusting part supplies, between the bearing surface and the guide surface, the compressed air forming the air film via the suction path by closing the communication port.

7. The air bearing according to claim 6, wherein
a region of the air film formed between the bearing surface and the guide surface when the flow rate adjusting part closes the communication port is wider than a region of the air film formed between the bearing surface and the guide surface when the flow rate adjusting part opens the communication port.

8. The air bearing according to claim 6, wherein
the negative pressure generating part has a nozzle that restricts a flow path of compressed air, and
the flow rate adjusting part supplies, between the bearing surface and the guide surface, the compressed air passed through the nozzle via the suction path by closing the communication port.

9. The air bearing according to claim 1, wherein
the flow rate adjusting part includes a moving member which moves in a moving direction upon receiving the compressed air pressure corresponding to the load applied to the main body part, and
the moving member moves to adjust the flow rate of air passing through the communication port between the flow path part and the discharge path.

10. The air bearing according to claim 9, wherein
the moving member moves back and forth in the moving direction in response to a pressure change of the compressed air corresponding to a pressure change of the load applied to the main body part.

11. The air bearing according to claim 10, wherein
the flow rate adjusting part further includes a biasing member that biases the moving member away from the communication port in the moving direction, and
the moving member moves to approach the communication port in the moving direction against the biasing force of the biasing member upon receiving the compressed air pressure.

12. The air bearing according to claim 9, wherein
the moving member includes an elastic member that is expandable in the moving direction upon receiving the compressed air pressure; and
a pillar part that moves in the moving direction in accordance with expansion and contraction of the elastic member to adjust the flow rate of the air passing through the communication port, the pillar part is provided on the tip side of the elastic member.

13. The air bearing according to claim 9, wherein
the moving member is a shaft member that moves in the moving direction upon receiving the compressed air pressure, and
a pillar part adjusts the flow rate of the air passing through the communication port in accordance with movement of the shaft member, the pillar part being provided on the tip side of the shaft member.

14. The air bearing according to claim 1, wherein
the flow rate adjusting part increases the flow rate of air flowing from the flow path part to the discharge path when the compressed air pressure is low, and reduces the flow rate of the air flowing from the flow path part to the discharge path when the compressed air pressure is high.

* * * * *